(12) United States Patent
Letendre (10) Patent No.: US 7,089,841 B2
(45) Date of Patent: Aug. 15, 2006

(54) ATTACHMENT ASSEMBLY FOR CONVENTIONAL BENCH SAW

(76) Inventor: Michel Letendre, 2620 Cr. Bernini, Brossard, Quebec (CA) J4Z 2S2

( * ) Notice: Subject to any disclaimer, the term of this patent is extended or adjusted under 35 U.S.C. 154(b) by 273 days.

(21) Appl. No.: 10/695,598

(22) Filed: Oct. 28, 2003

(65) Prior Publication Data
US 2005/0087050 A1    Apr. 28, 2005

(51) Int. Cl.
B27B 5/24 (2006.01)
B26D 7/06 (2006.01)

(52) U.S. Cl. .................. 83/473; 83/477.1; 83/471; 76/48

(58) Field of Classification Search ............... 83/473, 83/477.1, 471, 704, 705, 733; 76/37, 41, 76/43, 112, 48, 79, 40, 82, 82.1, 82.2; 51/122, 51/121, 2.31; 144/286.1, 286.5, 287, 114.1, 144/144.1, 144.51, 144.52, 145.1, 47
See application file for complete search history.

(56) References Cited

U.S. PATENT DOCUMENTS

| | | | | |
|---|---|---|---|---|
| 1,813,825 A * | 7/1931 | Stauder | ................ | 76/40 |
| 2,106,288 A * | 1/1938 | Tautz | ................ | 83/438 |
| 2,329,879 A * | 9/1943 | Christy et al. | ................ | 76/41 |
| 2,870,657 A * | 1/1959 | Hogue | ................ | 76/40 |
| 2,970,499 A * | 2/1961 | Pridemore | ................ | 76/43 |
| 3,447,401 A * | 6/1969 | Rasmussen | ................ | 76/43 |
| 4,016,781 A * | 4/1977 | Dudley | ................ | 76/40 |
| 4,357,841 A * | 11/1982 | Mote | ................ | 76/41 |
| 4,471,673 A * | 9/1984 | Rosenquist | ................ | 76/41 |
| 4,516,612 A * | 5/1985 | Wiley | ................ | 144/1.1 |
| 4,667,542 A * | 5/1987 | Erani | ................ | 76/79 |
| 4,939,869 A * | 7/1990 | Stoll | ................ | 451/45 |
| 2001/0027703 A1 * | 10/2001 | Rein | ................ | 76/45 |
| 2003/0233922 A1 * | 12/2003 | Makropoulos | ................ | 83/574 |

* cited by examiner

Primary Examiner—Allan N. Shoap
Assistant Examiner—Ghassem Alie
(74) Attorney, Agent, or Firm—Akerman Senterfitt (57) ABSTRACT

An attachment assembly for mounting to a conventional bench saw having a frame, a work supporting table on the frame displaying an opening therethrough and a pair of longitudinal grooves on a top face thereof, a moveable structure mounted to the frame and carrying a power operated shaft. The attachment assembly includes a tool base detachably mounted to the top face of the table; releaseable securing means fixed in a pair of grooves connected to a tool base for mounting the tool base to the table; and a tool device mounted on the tool base including a tool shaft and transmission means operatively connecting the tool shaft to the power operated shaft whereby rotation of the power operated shaft is transmitted to the tool shaft for operation of the tool device.

12 Claims, 13 Drawing Sheets

FIG_1

ATTACHMENT ASSEMBLY FOR CONVENTIONAL BENCH SAW

FIELD OF THE INVENTION

The present invention relates to an attachment assembly for mounting to a conventional bench saw.

BACKGROUND OF THE INVENTION

Conventional bench saws comprise a base, a work supporting table resting on top of the base and displaying a longitudinal opening therethrough, and one longitudinal groove on each side of said opening; a moveable structure is mounted on the base and carries a power operated main shaft, and means for causing vertical displacement of the shaft-carrying structure relative to the table.

Bench saw operators are dependent upon outside sources in order to perform certain operations, such as the resharpening of their saw blades. This situation generally entails that the operators hold up their decision on taking their blades out for resharpening, to keep up with production. This has a direct impact on the quality of the work performed, as well as on the pleasure of doing it.

Furthermore, the useful life of a saw blade drops dramatically, when resharpening is unduly delayed, which translates into an economically harmful factor.

Existing saw blade resharpening machines are stable and heavy, because of the high precision and severe work duty associated with the resharpening process. These machines are therefore expensive, and require a significant floor space area.

Other operations which could be performed using the conventional bench saw, as a convenient base and power source, include wood sanding and wood planing.

OBJECTS AND STATEMENT OF THE INVENTION

It is an object of the present invention to provide an assembly which can be attached to a conventional bench saw in order to perform certain operations, other than cutting wood.

It is also an object of the present invention to provide an attachment assembly to a conventional bench saw, which will allow the operator to resharpen his own saw blades.

Common practice tells that the face only of the saw blade tips, should be resharpened.

Stability and heaviness are both intrinsic characteristics of conventional bench saws.

Therefore, in accordance with the present invention, the resharpening tool is mounted directly to a conventional bench saw, and is made to be driven by its power shaft.

Conventional bench saws have two longitudinal grooves on the top face thereof, and the resharpening tool is made to be quickly mounted in these two grooves.

The resharpening tool is also made to operate in very little time, due to the simplicity in the connecting of the transmission element between the resharpening tool shaft and the conventional bench saw power shaft.

Furthermore, the resharpening tool assembly is light and easy to manoeuvre, since it does not incorporate a motor, because the motor driving the conventional bench saw is also driving the resharpening tool, via the transmission element.

Another advantage of the present invention is that the operator will be in a position to resharpen his blades, at the very moment he feels the blades need to be resharpened. A few minutes only will be required to resharpen a blade, and the operator will no longer have to work with non-performing blades. Furthermore, the operator will no longer have to pay for outside resharpening services.

The operator will also obtain an increase in longevity of his saw blades, again resulting in a reduction in operating costs. Finally, the operator will not need to acquire and use extra blades, to keep him working, while his other blades are out for resharpening, again reducing operating costs.

The present invention therefore relates to an attachment assembly for mounting to a conventional bench saw having: a frame, a work supporting table on a frame displaying an opening therethrough and a pair of longitudinal grooves on a top face thereof, a moveable structure mounted to a frame and carrying a power operated shaft, and means in a frame for causing vertical displacement of a power operated shaft relative to a table; an attachment assembly comprising:

a tool base detachably mounted to a top face of a table;
releaseable securing means fixed in a pair of grooves connected to a tool base for mounting a tool base to a table; and
a tool device mounted on a tool base including a tool shaft and transmission means operatively connecting the tool shaft to the power operated shaft whereby rotation of a power operated shaft is transmitted to a tool shaft for operation of a tool device.

In one form of the invention, the base is mounted at three separate points in the pair of grooves.

In another form of the invention, the releasable securing means each consist of three successfully aligned co-operating components interconnected by a bolt whereby rotation of the bolt causes transverse displacement of the components relative to one another in the groove, to tightly engage the groove or to be disengaged therefrom.

In another form of the invention, the transmission element consists of a belt interconnecting two pulleys, one of which is permanently installed on the shaft of the tool device, the other loose pulley is installed on the conventional bench saw power shaft, and tightened with the bench saw blade nut. The necessary tension in the belt is created by lowering the conventional bench saw power shaft, with the conventional bench saw handwheel.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

DESCRIPTION OF PREFERRED EMBODIMENTS

Figure 1:
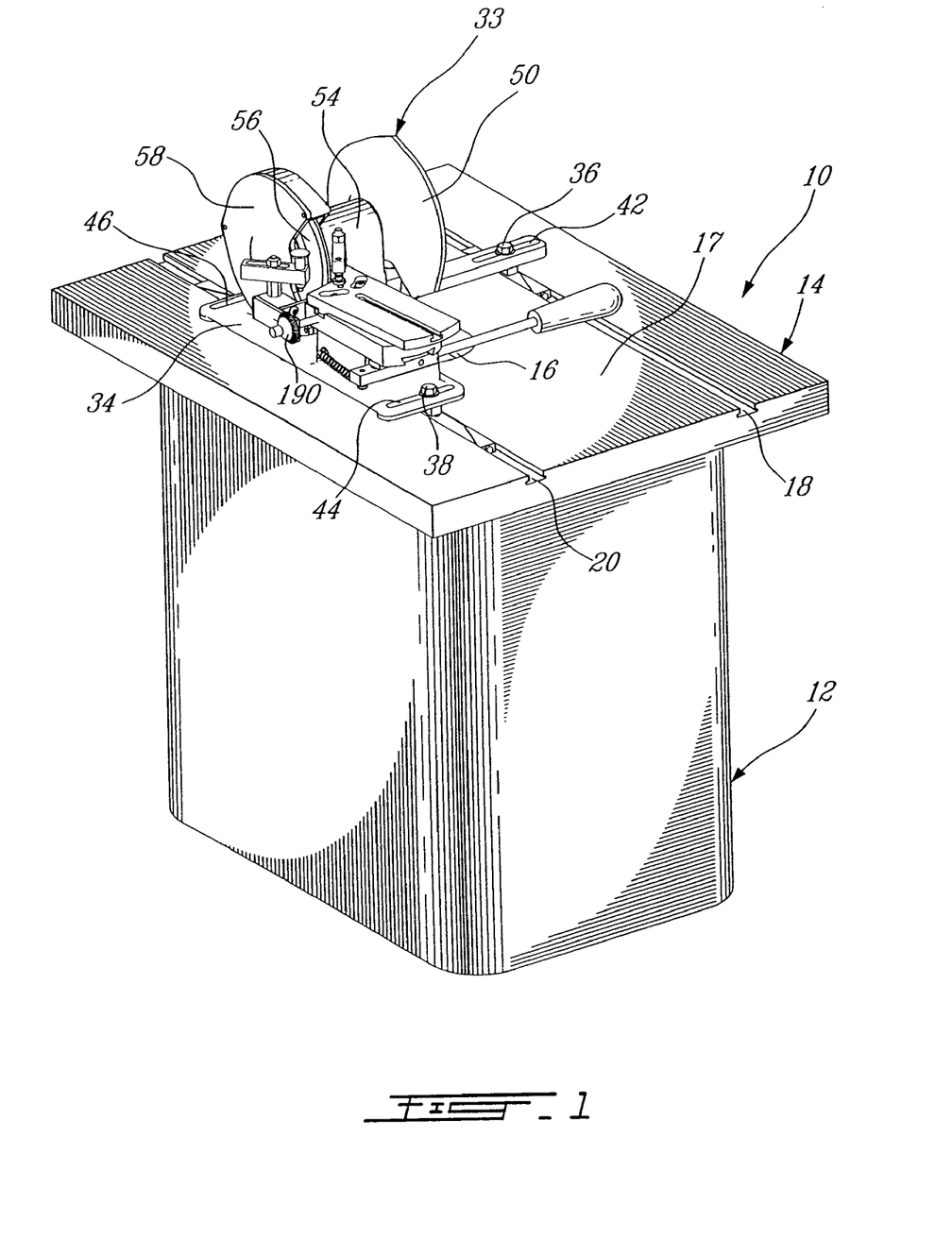
FIG. 1 is a perspective view of a conventional bench saw to which is mounted an attachment assembly in accordance with the present invention.

Referring to FIG. 1, there is shown a conventional bench saw, generally denoted 10, having a base 12, a work supporting table 14 mounted over the base and displaying a longitudinal opening 16 (see also FIGS. 6 and 7) and, on its top face 17 thereof, a pair of longitudinal grooves 18 and 20, each having an inverted T-shaped configuration.

Figure 2:
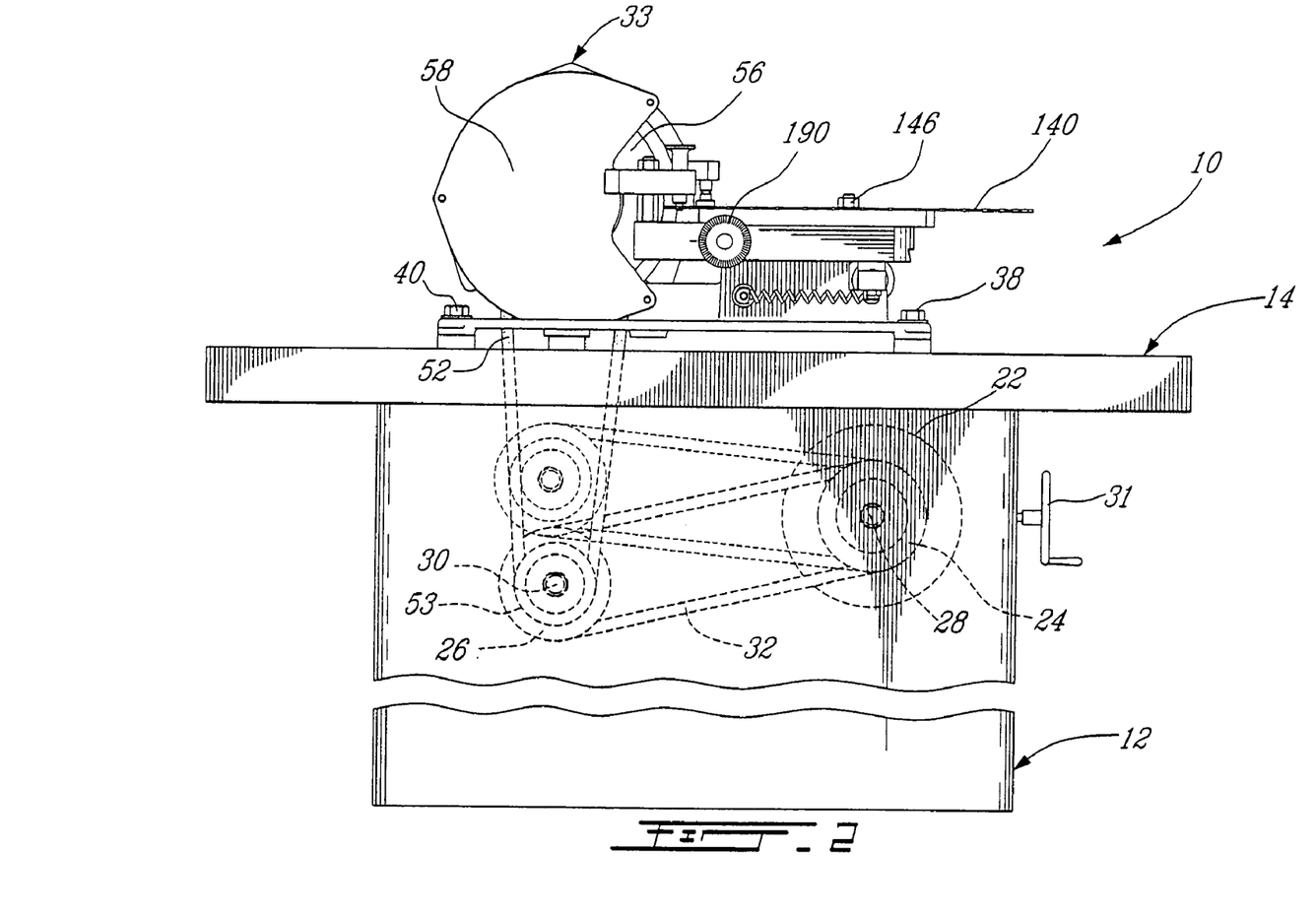
FIG. 2 is a side elevational view thereof showing a saw blade to be resharpened on the attachment assembly.

Referring to FIG. 2, the conventional bench saw base 12 houses a vertically moveable structure comprising the motor, shown in dotted lines as 22, and the power operated shaft 30. The motor 22 is driving the power operated shaft 30 by means of pulleys 24 and 26, respectively mounted on shafts 28 and 30, and a drive belt 32. The mechanism for vertically changing the height of the power operated shaft is not shown, as it does not form part of the present invention. The vertical position of the power operated shaft is easily changed and set, by the operator, with the conventional bench saw handwheel 31.

Referring to FIGS. 1 and 2, the attachment assembly of the present invention is designated generally as 33. It comprises a base 34 which is detachably mounted to the top face 17 of the table 14, via a releasable securing means to which base 34 is attached, by means of three bolts, two being shown as 36 and 38 in FIG. 1, while bolt 40 is shown in FIG. 2. These bolts extend through elongated slots 42, 44 and 46 provided on the base 34.

The attachment assembly displays a belt safety cover 50, in which is housed a pulley (not shown), and a transmission element comprising a belt 52 (see FIG. 2) and a second pulley 53 which is to be releasably mounted to the power shaft of the conventional bench saw. Belt 52 drives the tool shaft pulley (not shown), on the tool shaft which extends through a housing 54 for rotating a resharpening wheel 56 to which it is connected, the resharpening wheel being partially housed in a safety cover 58.

The tool base 34, as mentioned above, is detachably mounted to the top face 17 of the table 14 by means of releasable securing means engaged in grooves 18 and 20.

Figure 3:
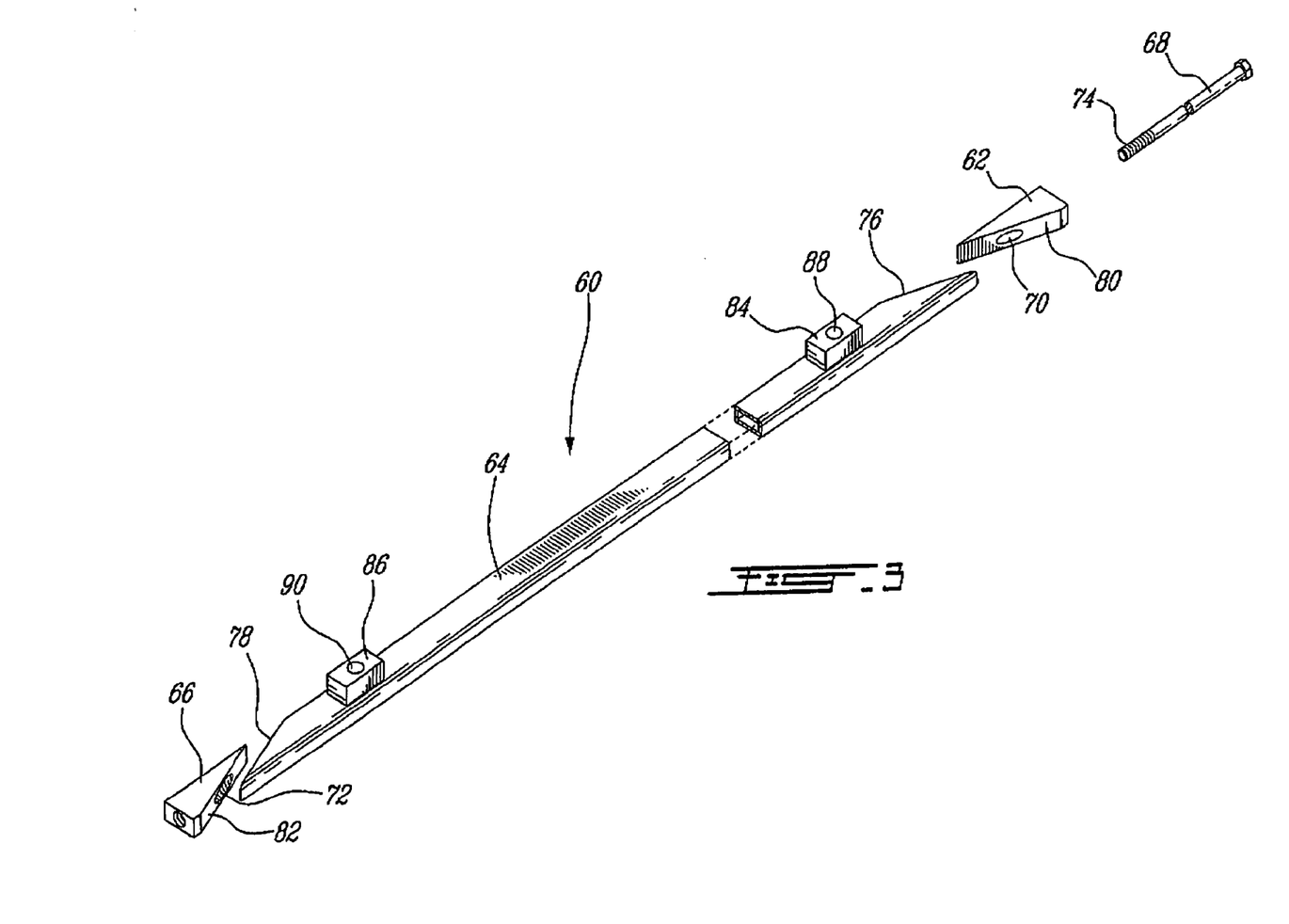
FIG. 3 is a perspective exploded view of one set of connecting components located in one of the grooves in the top face of the bench saw.

Referring to figure 3, there is shown a first of said releasable securing means, generally denoted 60, which is adapted to be received in the groove 20. It consists of three components 62, 64, 66 and suitable to be received within the groove wherein they are longitudinally aligned. The three components are adapted to be interconnected by means of a bolt 68 which is insertable through corresponding openings in each of the components (two being shown as 70 and 72 in the opposite components 62 and 66. The threaded end 74 of the bolt 68 is adapted to threadedly engage the threaded opening 72 of the component 66. The center component 64 is tubular in shape and has two oblique end faces 76 and 78 which are adapted to slidably contact similar oblique faces 80 and 82, respectively, of the end components 62 and 66. The top face of the central component 64 displays a pair of blocks 84 and 86 with openings 88 and 90 in order to threadedly receive bolts 38 and 40 of the attachment assembly.

Figure 4:
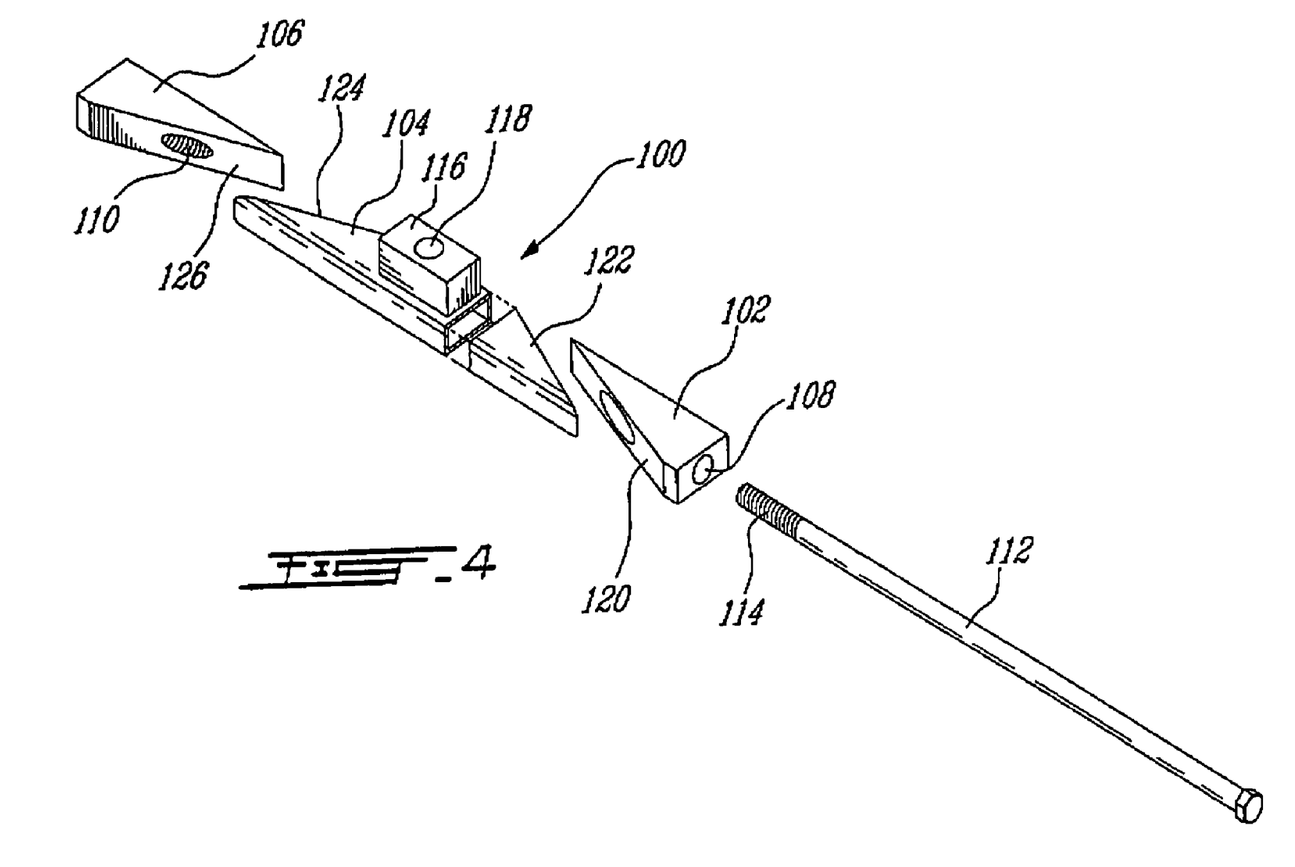
FIG. 4 is a perspective exploded view showing another similar set of connecting components located in the other groove in the top face of the bench saw.

Referring to FIG. 4, there is shown another releasable securing means, generally denoted 100, consisting of three components 102, 104 and 106, each having an opening (two being shown as 108 and 110 in end components 102 and 106) to receive a bolt 112 having a threaded end 114 adapted to threadedly engage the opening 110 of the end component 106. The central component 104 is tubular in shape and displays a block 116 with an opening 118 to threadedly receive bolt 36 of the attachment assembly. As in FIG. 3, the three components have contacting angular end faces 120 and 122 as well as 124 and 126 for respective sliding contact therebetween when bolt 112 is inserted in the openings.

Hence, the securement of the attachment assembly to the top face of the table 14 is accomplished by first installing the loose pulley 53 on the conventional bench power shaft 30 and tightening a saw blade nut (not shown). Then, by inserting the releasable securing means 60 in groove 20 as well as the securing means 100 in the groove 18, and with the attachment assembly placed on the top face of the bench saw, bolts 36, 38 and 40 are inserted in their respective slots of the base 34 and are then permanently connected to their respective blocks 116, 84 and 86. Rotation in one direction of the bolts 68 and 112 then causes their corresponding threesome arrangement of components to contact and press the opposite side walls of their corresponding grooves as a result of the sliding contact of the end faces of the components. Rotation in the opposite direction releases the base and releasable securing means 60 and 100 from the top face of table 14.

The vertically movable structure of the conventional bench saw will assist in the installation of the transmission element for the operation of the attachment assembly of the present invention, as described hereinbelow.

After the attachment assembly has been secured to the top face of the table 14 and the loose pulley 53 installed on the conventional bench saw power shaft 30, as previously described, the belt 52 of the transmission element has to go around pulleys 53 and the pulley (not shown) on the tool shaft, after which the moveable structure has to be lowered with handwheel 31 to achieve proper belt tension.

Figure 12:
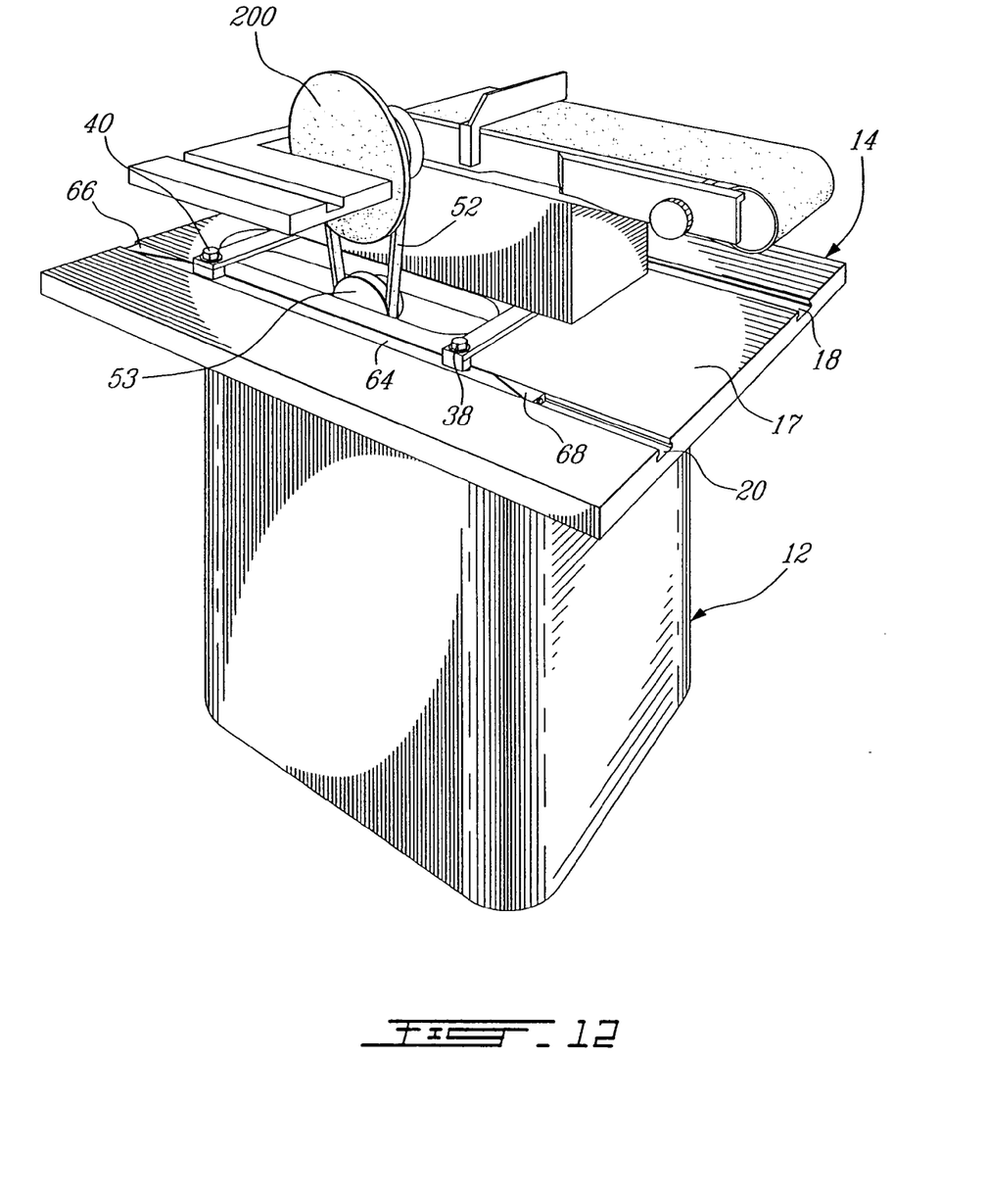
FIG. 12 shows another embodiment of an attachment assembly for sanding operation of a work piece.
Figure 13:
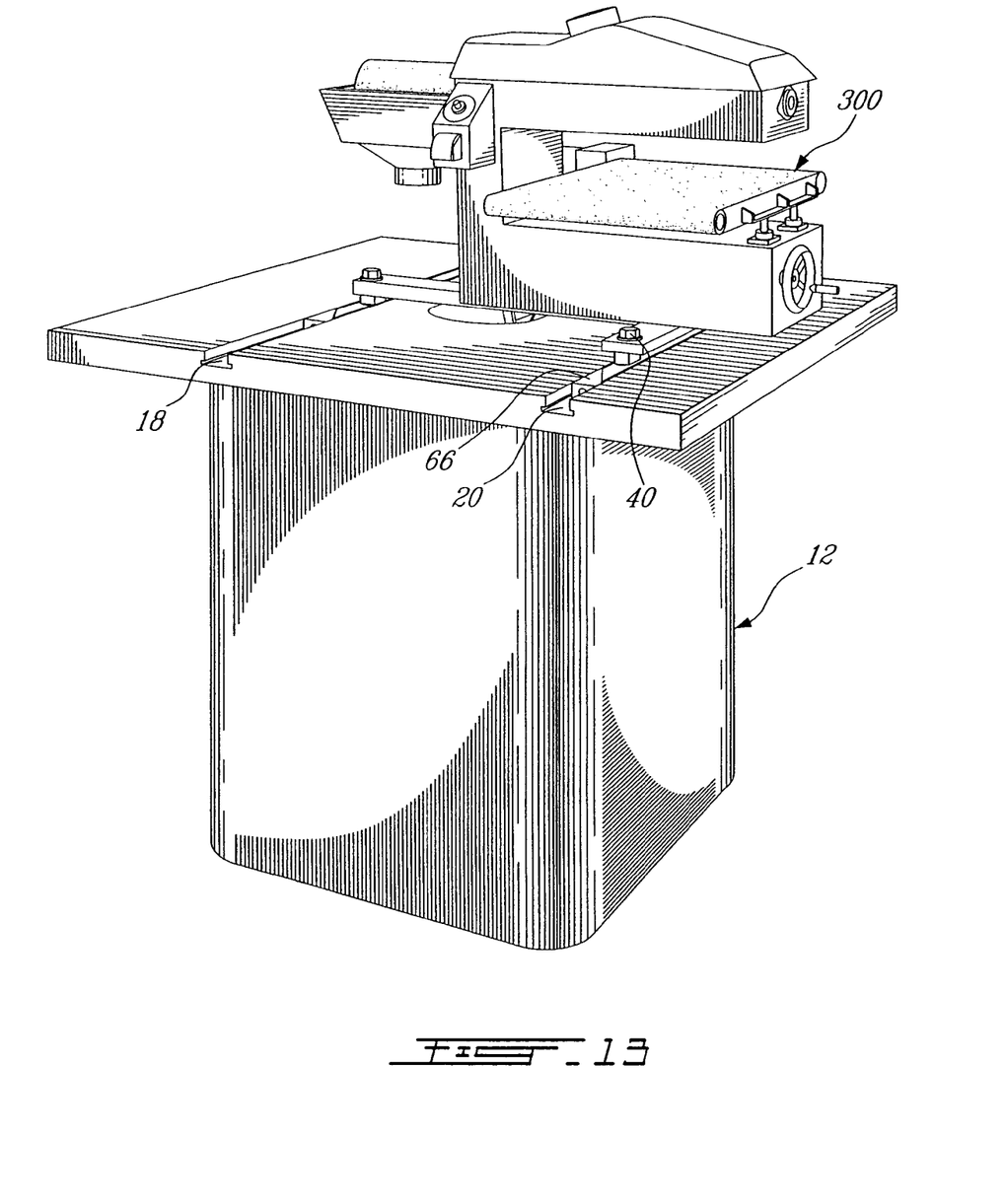
FIG. 13 is another embodiment of an attachment assembly for mounting to a conventional bench saw for wood planing.

The attachment assembly of the present invention may be used for various woodworking operations. The assembly illustrated in FIGS. 1–11 as attached to a conventional bench saw is for the resharpening of saw blades. However, as described further hereinbelow, other woodworking devices, 200, 300, such as illustrated in figures 12 and 13, may be similarly attached to, and driven by, a conventional bench saw.

Figure 5:
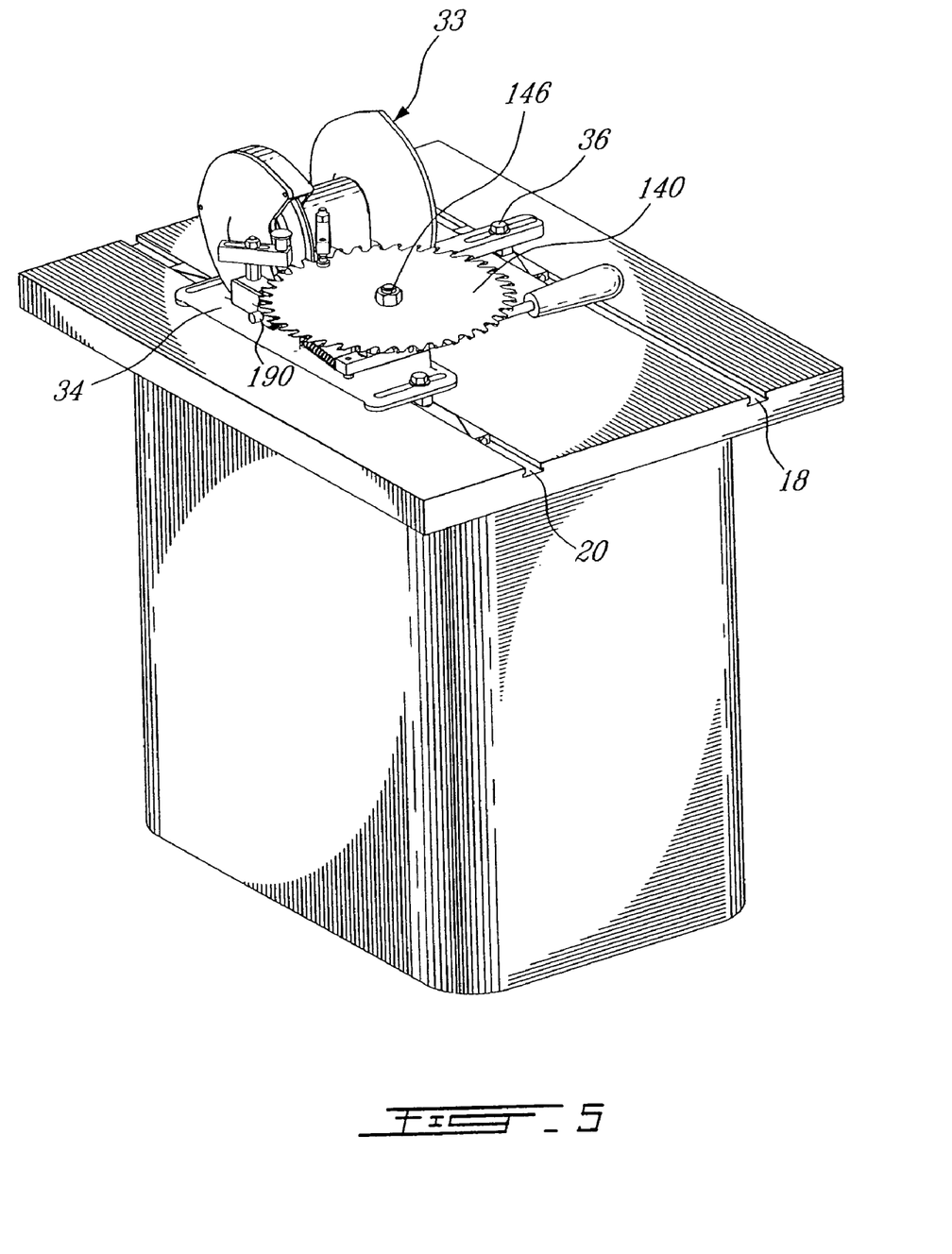
FIG. 5 is a perspective view, as in FIG. 1, including a saw blade ready for resharpening.
Figure 6:
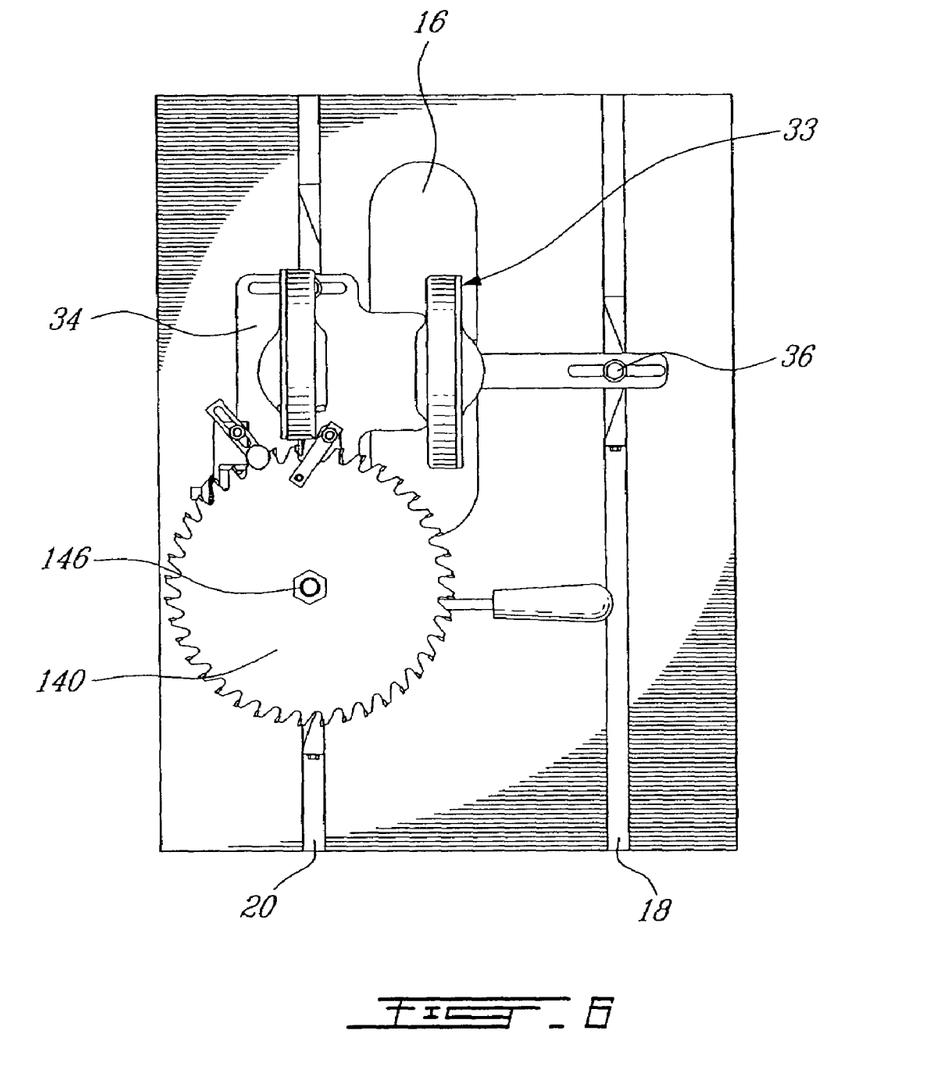
FIG. 6 is a top plan view of the assembly shown in FIG. 5.

As illustrated in FIGS. 5 and 6, the attachment assembly 33 shown is used for the resharpening of a saw blade 140.

Figure 7:
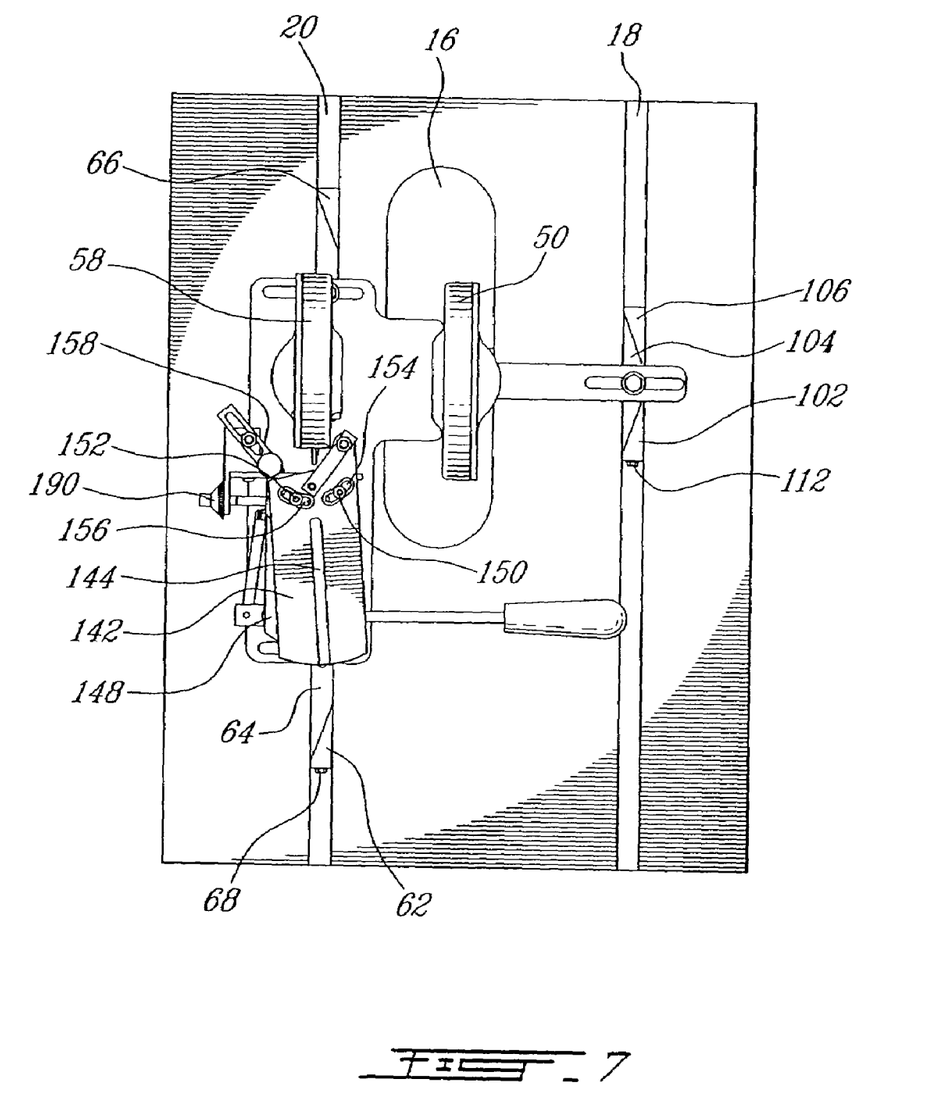
FIG. 7 is a top plan view of the assembly shown in FIG. 1.

Referring to FIG. 7, the attachment assembly of this embodiment comprises a blade supporting table 142 having an elongated slot 144 with an inverted T-shaped configuration in order to receive the head of a bolt 146 (see FIG. 6) to secure the blade 140 horizontally on the support table 142.

Figure 8:
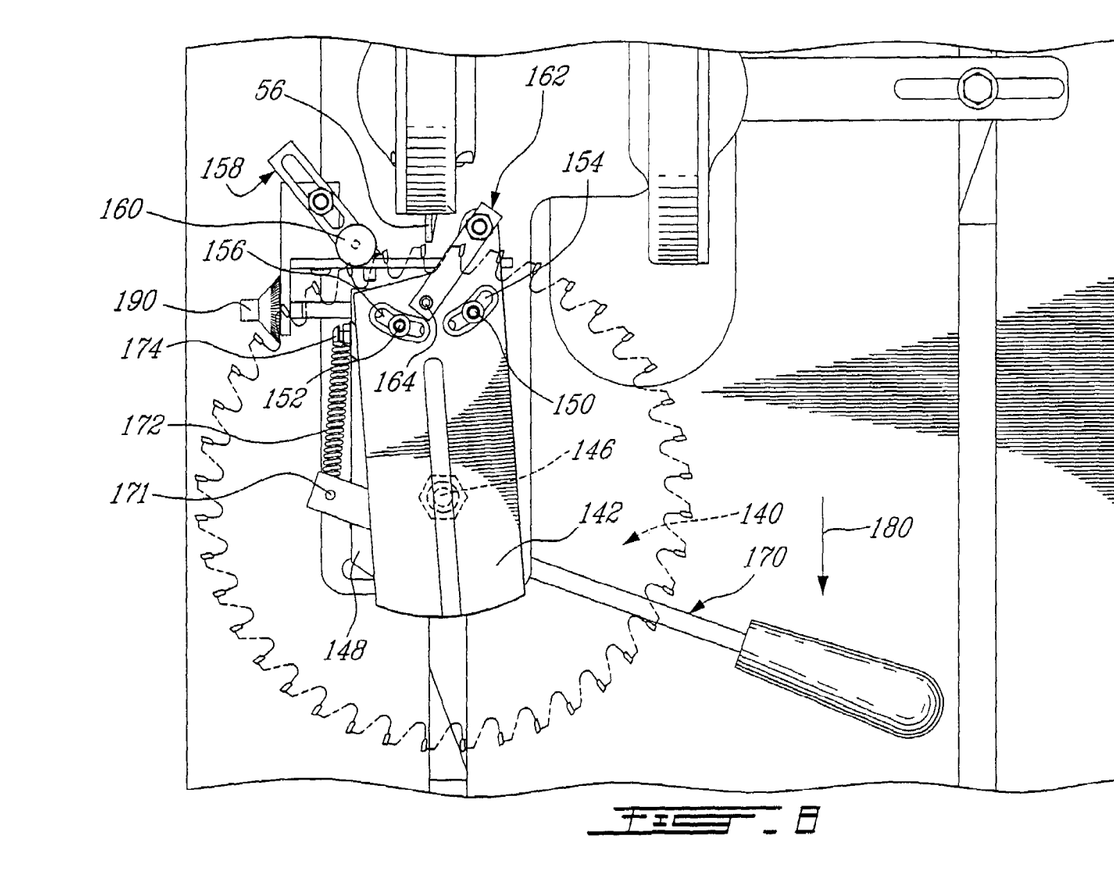
FIGS. 8 & 9 are enlarged top plan views of the blade supporting mechanism in the retracted and forward positions respectively.

Referring also to FIG. 8, the support table 142 is angularly moveable with respect to an under plate 148 to which it is connected by means of two bolts 150 and 152 extending through a pair of curved slots 154 and 156. A blade tooth locator 158 is pivotally mounted to under plate 148, and has a circular extremity 160 which is adapted to be positioned between two consecutive teeth of the blade. Also pivotally mounted to the support table 142 is a stabilizing device 162 which has one extremity 164 adapted to contact the top face of the blade 140 when positioned on the blade support table 142.

As illustrated in some of the drawings, connected to a threaded shaft is a micrometric dial 190 adapted for micrometric positioning of blade teeth with reference to the resharpening wheel 56.

Figure 9:
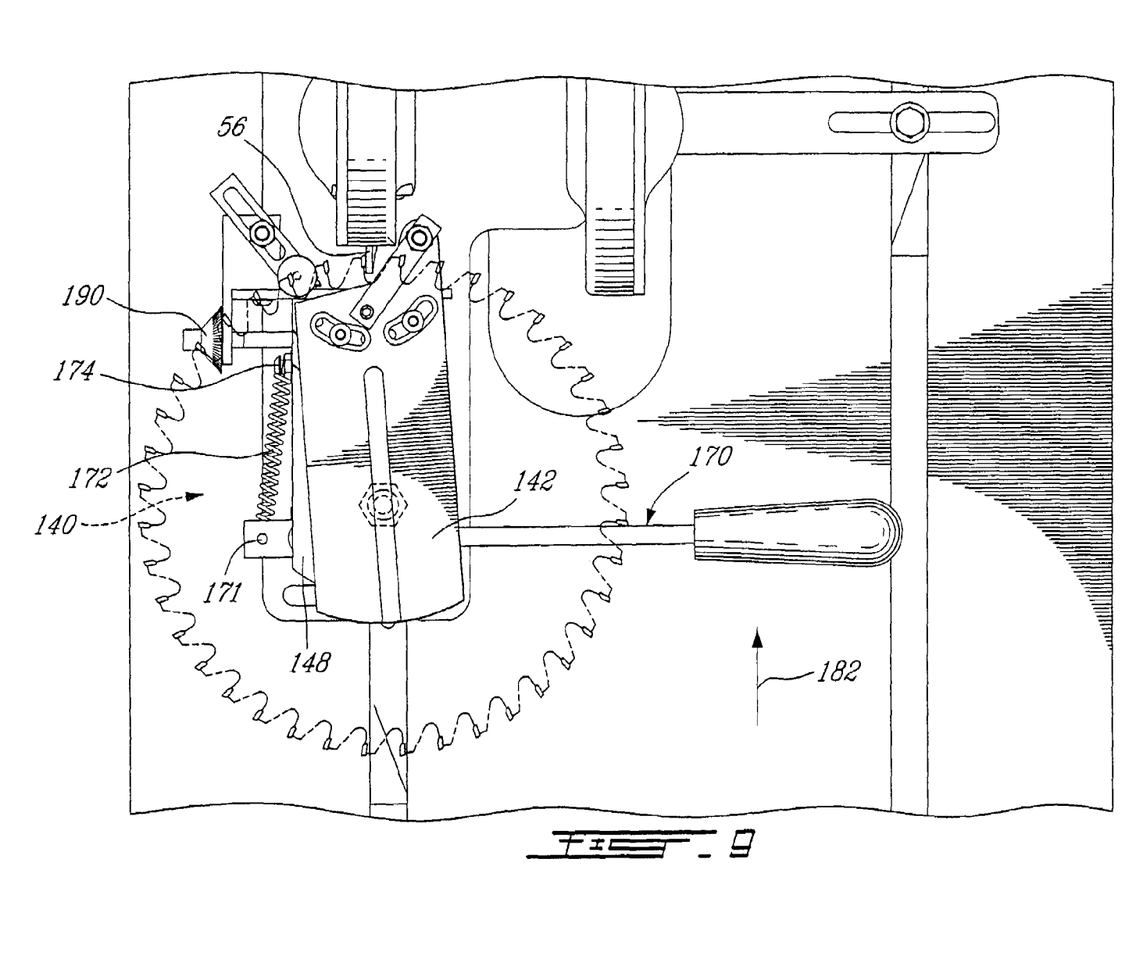
Figure 10:
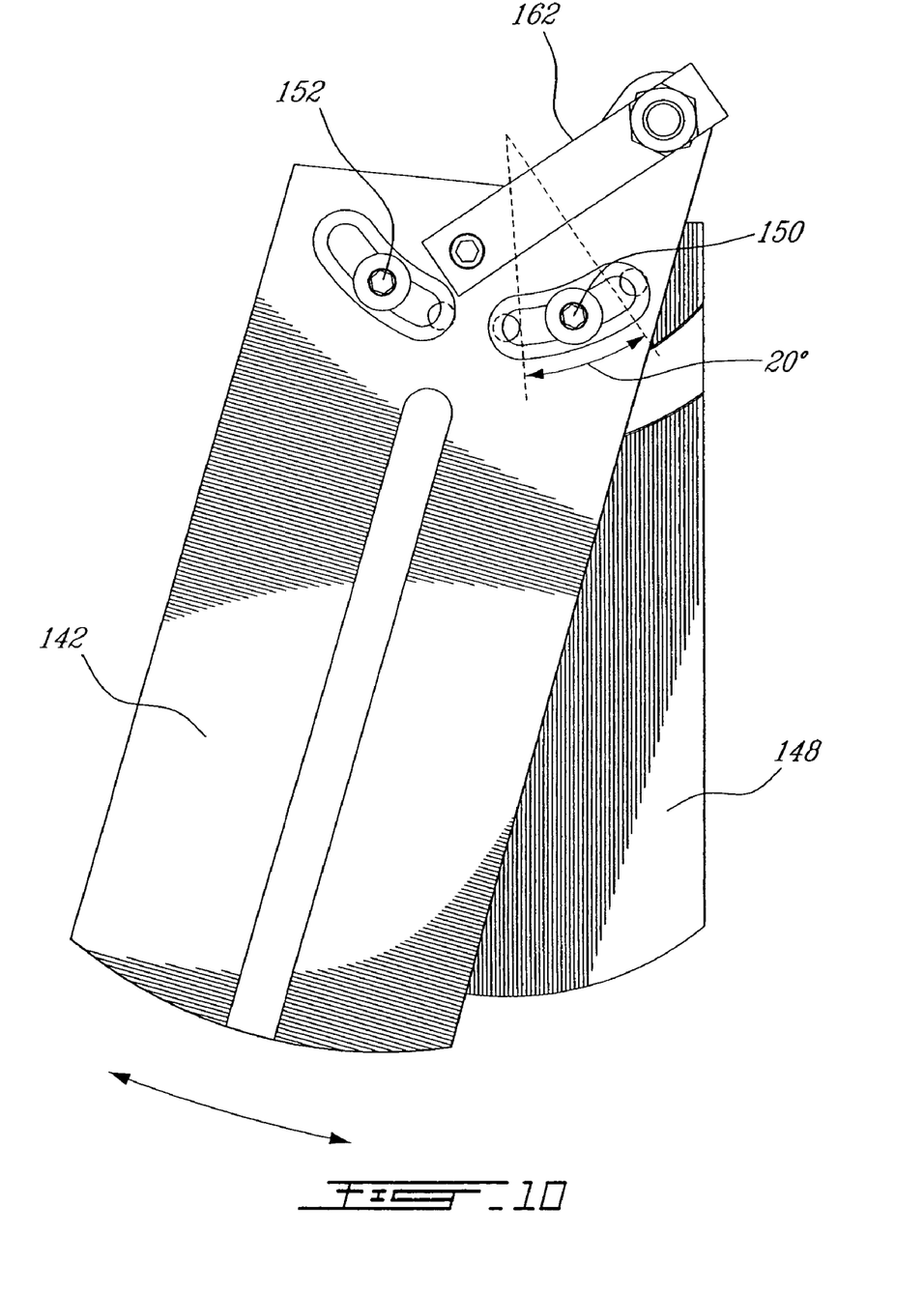
FIGS. 10 & 11 show two angular positions of the blade supporting structure.
Figure 11:
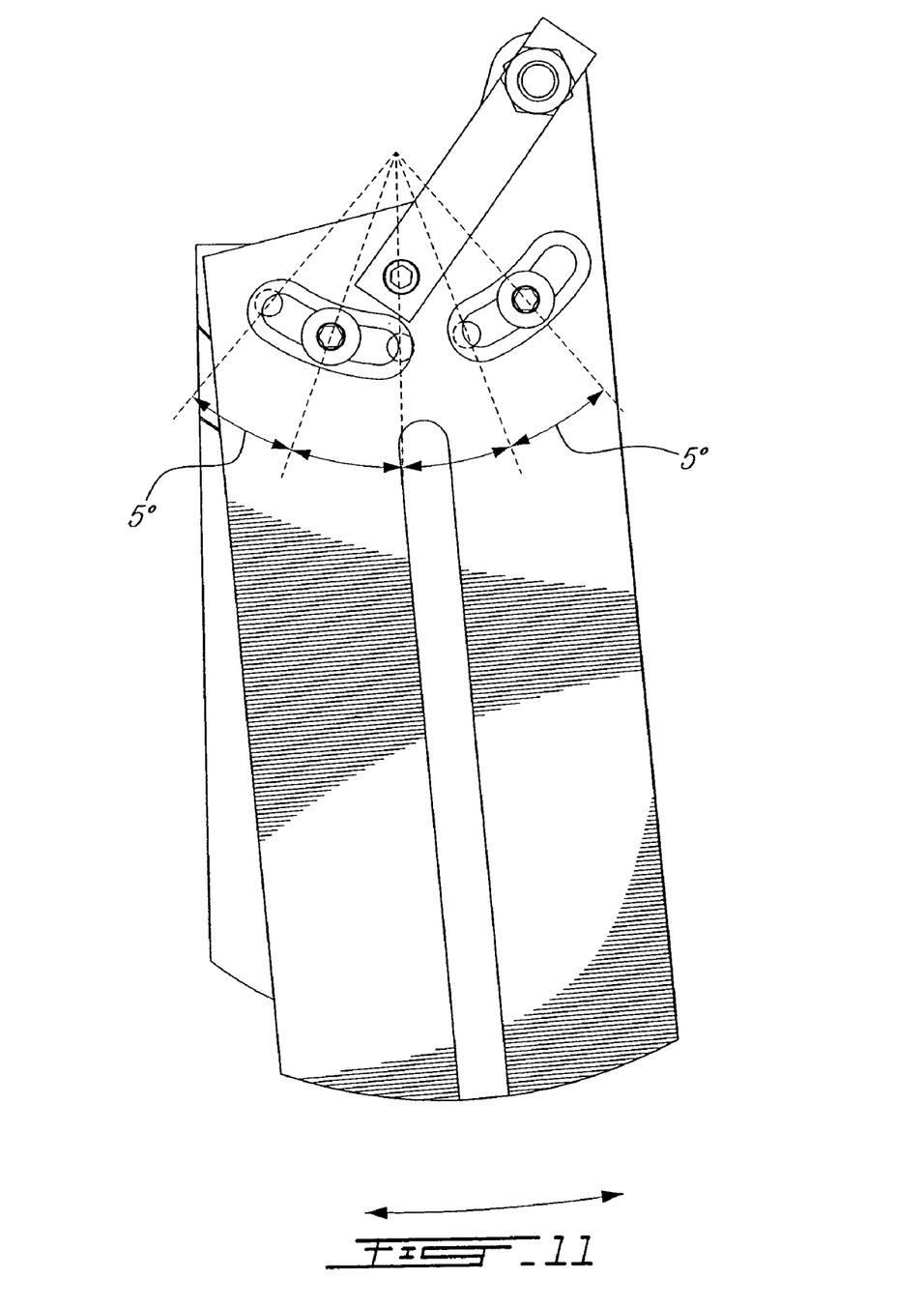

Referring also to FIG. 9, the under plate 148 is adapted to move to and from the resharpening wheel 56 by means of a lever 170, one end 171 of which is connected to a tension spring 172 which has its opposite end 174 connected to the base of the tool assembly.

As can be seen in FIGS. 8 and 9, actuating the lever 170 in the directions indicated by arrows 180 and 182 causes the underplate 148 to move away from and towards the resharpening wheel 56.

Although the invention has been described above with respect to one specific form, it will be evident to a person skilled in the art that it may be modified and refined in various ways. It is therefore wished to have it understood that the present invention should not be limited in scope, except by the terms of the following claims.

The invention claimed is:

1. An attachment assembly for mounting to a conventional bench saw having:
   a frame, a work supporting table on said frame displaying an opening therethrough and a pair of longitudinal grooves on a top face thereof, a moveable structure mounted to said frame and carrying a power operated shaft, and means in said frame for causing vertical displacement of said shaft relative to said table;
   said attachment assembly comprising:
   a tool base detachably mounted to said top face of said table;
   releasable securing means fixed in said pair of longitudinal grooves and connected to said tool base for mounting said tool base to said table; and
   a tool device mounted on said tool base including a tool shaft and transmission means operatively connecting said tool shaft to said power operated shaft whereby rotation of said power operated shaft is transmitted to said tool shaft for operation of said tool device.

2. An attachment assembly as defined in claim 1, wherein said base is mounted at three separate points in said pair of grooves, two of said points being located in a first of said grooves and a third point being located in a second of said grooves.

3. An attachment assembly as defined in claim 2, wherein said releasable securing means each consist of three successively aligned cooperating components interconnected by a bolt whereby rotation of said bolt causes transverse displacement of said components relative to one another in said groove to tightly engage said groove or to be disengaged therefrom.

4. An attachment assembly as defined in claim 3, wherein said components have angular abutting faces laterally slidable relative to one another upon tightening and untightening of said bolt.

5. An attachment assembly as defined in claim 3, wherein the middle intermediate component of said three aligned components includes means for securing said base thereto.

6. An attachment assembly as defined in claim 1, wherein said transmission means consist of a pulley and a belt, said belt passing through said opening in said table.

7. Au attachment assembly as defined in claim 1, wherein said tool device is a saw blade resharpening tool.

8. An attachment assembly as defined in claim 7, further comprising a resharpening wheel mounted on said tool shalt; a support located adjacent said wheel to receive thereon a saw blade to be resharpened; and means allowing said support to move to and from said wheel.

9. An attachment assembly as defined in claim 8, further comprising means to adjust angularly said support relative to said wheel.

10. An attachment assembly as defined in claim 8, further comprising means for teeth locating on said saw blade to be resharpened when in a blade resharpening operation.

11. An attachment assembly as defined in claim 8, further comprising means for pressing said saw blade downwardly w prevent vibrations during blade resharpening operation.

12. An attachment assembly as defined in claim 9, further comprising means for micrometric positioning of said teeth locating means.

* * * * *